United States Patent
Ceponkus et al.

(10) Patent No.: US 9,558,249 B2
(45) Date of Patent: Jan. 31, 2017

(54) MOBILE WIRELESS COMMUNICATIONS DEVICE TO PERFORM LOCAL AND REMOTE SEARCH AND ASSOCIATED METHODS

(71) Applicant: BlackBerry Limited, Waterloo (CA)

(72) Inventors: Alexander Vitas Ceponkus, Ancaster (CA); Gil Pinheiro, Cambridge (CA); Prabhul Dev, Ottawa (CA); Naresh Parmar, Woodbridge (CA)

(73) Assignee: BlackBerry Limited, Waterloo, Ontario (CA)

( * ) Notice: Subject to any disclaimer, the term of this patent is extended or adjusted under 35 U.S.C. 154(b) by 25 days.

(21) Appl. No.: 14/291,218

(22) Filed: May 30, 2014

(65) Prior Publication Data

US 2014/0273997 A1 Sep. 18, 2014

Related U.S. Application Data

(63) Continuation of application No. 13/091,626, filed on Apr. 21, 2011, now Pat. No. 8,744,415.

(60) Provisional application No. 61/327,408, filed on Apr. 23, 2010.

(51) Int. Cl.
G06F 17/30 (2006.01)
H04W 4/00 (2009.01)

(52) U.S. Cl.
CPC ... *G06F 17/30554* (2013.01); *G06F 17/30112* (2013.01); *H04W 4/003* (2013.01)

(58) Field of Classification Search
CPC ................ H04W 4/003; G06F 17/3002; G06F 17/30864
See application file for complete search history.

(56) References Cited

U.S. PATENT DOCUMENTS 7,130,841 B1 * 10/2006 Goel ................ G06F 17/30864
707/722
2007/0143277 A1 * 6/2007 Van De Laar ...... G06F 17/3002

* cited by examiner

*Primary Examiner* — Myron K Wyche
(74) *Attorney, Agent, or Firm* — Donna Flores; Fleit Gibbons Gutman Bongini & Bianco P.L.

(57) ABSTRACT

A mobile wireless communications device is to communicate with a server storing a plurality of file folders, and includes a display, a wireless transceiver, and a processor all carried by a housing. The processor is configured to wirelessly download an initial portion of a selected file folder from the server, with the server still having a remainder portion of the selected file folder available for downloading. The processor also generates search results by performing a local search of the initial portion of the file folder, and performs a remote search of the reminder portion of the selected file folder. The processor further presents the search results on the display.

20 Claims, 6 Drawing Sheets

MOBILE WIRELESS COMMUNICATIONS DEVICE TO PERFORM LOCAL AND REMOTE SEARCH AND ASSOCIATED METHODS

PRIORITY CLAIM

This application is a continuation of the application titled "MOBILE WIRELESS COMMUNICATIONS DEVICE TO PERFORM LOCAL AND REMOTE SEARCH AND ASSOCIATED METHODS," application Ser. No. 13/091,626, filed Apr. 21, 2011, now U.S. Pat. No. 8,744,415 issued Jun. 3, 2014, which is related to the following prior application titled "MOBILE WIRELESS COMMUNICATIONS DEVICE TO PERFORM LOCAL AND REMOTE SEARCH AND ASSOCIATED METHODS," U.S. Provisional Application No. 61/327,408, filed Apr. 23, 2010. These prior applications, including the entire written description and drawing figures, are hereby incorporated into the present application by reference.

TECHNICAL FIELD

The present disclosure relates to the field of communications, and, in particular, mobile wireless communications devices.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices also allow users to send and receive electronic mail (email) messages wirelessly and access the Internet via a cellular network and/or a wireless local area network (WLAN), for example. In addition, these devices may allow users to send Short Messaging Service (SMS) messages, Personal Identification Number (PIN) messages, and instant messages.

Some mobile devices may be able to access remote file servers and to download files from those remote file servers. Given the amount of information now stored on a mobile device itself, and the amount of data remotely accessible by a mobile device, a user may wish to search for a specific e-mail, data file media file, or contact, for example. This search may be performed locally on the mobile device, or may be performed remotely on a file server.

Given the relatively slow nature of the wireless communications of some mobile devices, there may be a significant communications lag when performing a remote search. The mobile device sends search terms to the file server, and the file server then performs the search, and subsequently sends the search results back to the mobile device. Since some search results may be relatively large, the time from the initiation of the search on the mobile device to the receipt of the search results by the mobile device may be greater than desired.

As such, enhanced methods of searching remote servers are needed.

DETAILED DESCRIPTION

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a mobile wireless communications device for communicating with a server storing a plurality of file folders is provided. The communications device may include a housing carrying a display, a wireless transceiver, and a processor. The processor may be coupled to the wireless transceiver and display, and may be configured to wirelessly download an initial portion of a selected file folder from the server, with the server still having a remainder portion of the selected file folder available for downloading. The processor may also be configured to generate search results by performing a local search of the initial portion of the file folder, and performing a remote search of the reminder portion of the selected file folder, and present the search results on the display.

The processor may also be configured to generate the search results based upon a search term comprising a plurality of characters, and may wirelessly send the search term to the server a threshold time after input of a most recent character of the search term. The mobile wireless communications device may include an input device, and the processor may be configured to receive the search term based upon the input device.

The initial portion of the selected file folder may comprise a plurality of sequentially listed selectable files. In some applications, the initial portion of the selected file folder may include at least one subfolder with a plurality of sequentially listed selectable files therein. The initial portion of the selected file folder may include file information about a plurality of sequentially listed selectable files. The file information may be, for each of the plurality of sequentially listed selectable files, at least one of a file name, a file type, and a file size.

A method aspect is directed to a method of operating a mobile wireless communications device for communicating with a server storing a plurality of file folders and comprising a processor cooperating with a wireless transceiver and a display. The method may include wirelessly downloading, via the wireless transceiver, an initial portion of a selected file folder from the server, with the server still having a remainder portion of the selected file folder available for downloading. The method may also include generating search results, via the processor, by performing a local search of the initial portion of the file folder, and performing a remote search of the reminder portion of the selected file folder. Further, the method may include presenting the search results on the display.

Another aspect is directed to a non-transitory computer readable medium containing processor executable instructions. The processor executable instructions, when executed by a processor, cause the processor to wirelessly download, via the wireless transceiver, an initial portion of a selected file folder from among a plurality thereof on a server, with the server having a remainder portion of the selected file folder available for downloading. The processor executable instructions also cause the processor to generate search results by performing a local search of the initial portion of the file folder and causing a remote search of the remainder portion of the selected file folder. The processor executable instructions also cause the processor to present the search results on a display.

Figure 1:
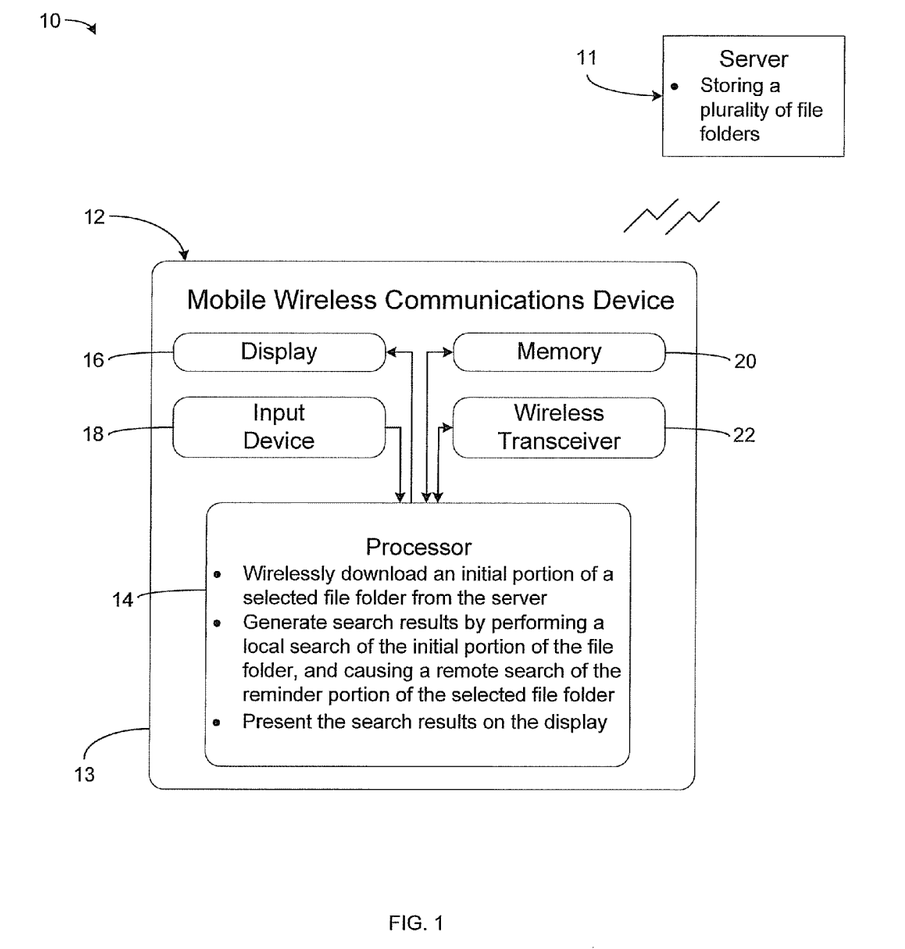
FIG. 1 is a schematic block diagram of a communications system in accordance with the present disclosure.

With reference to FIG. 1, a communications system 10 is now described. The communications system includes a server 11, for example a Microsoft Sharepoint® server, that stores a plurality of file folders. Those skilled in the art will appreciate that both data files and subfolders may be stored in the file folders. The communications system also includes a mobile wireless communications device 12.

The mobile wireless communications device 12 includes a portable housing 13 carrying a processor 14. The processor 14 is coupled to a display 16, an input device 18, a memory 20, and a wireless transceiver 22. The input device 18 may be a keyboard and/or a trackball. The input device 18 may also be a touchpad. Additionally or alternatively, the display 16 may be a touch sensitive display, and may therefore serve as the input device 16. Further, the memory 20 may be random access memory (RAM) in some applications, but may also be flash RAM, electronically erasable read only memory (EEPROM), a memory card, or another suitable device. The mobile wireless communications device 12 may communicate with the server 11 via a Wide Area Network (WAN), such as the Internet.

The processor 14 cooperates with the wireless transceiver 22 to wirelessly download an initial portion of a selected file folder from the server, leaving a remainder portion of the selected file folder available on the server 11 for download. The initial portion may include the contents of the data contained in the selected file folder, in some embodiments.

The processor 14 also generates search results by performing a local search of the initial portion of the file folder, and by causing a remote search of the remainder portion of the selected file folder to be performed. This advantageously saves time and bandwidth by allowing a quick local search of the initial portion, and then performing a remote search of the remainder portion, instead of performing a remote search of both the initial portion and the remainder portion. After generating the search results, the processor 14 presents the search results on the display.

Figure 2:
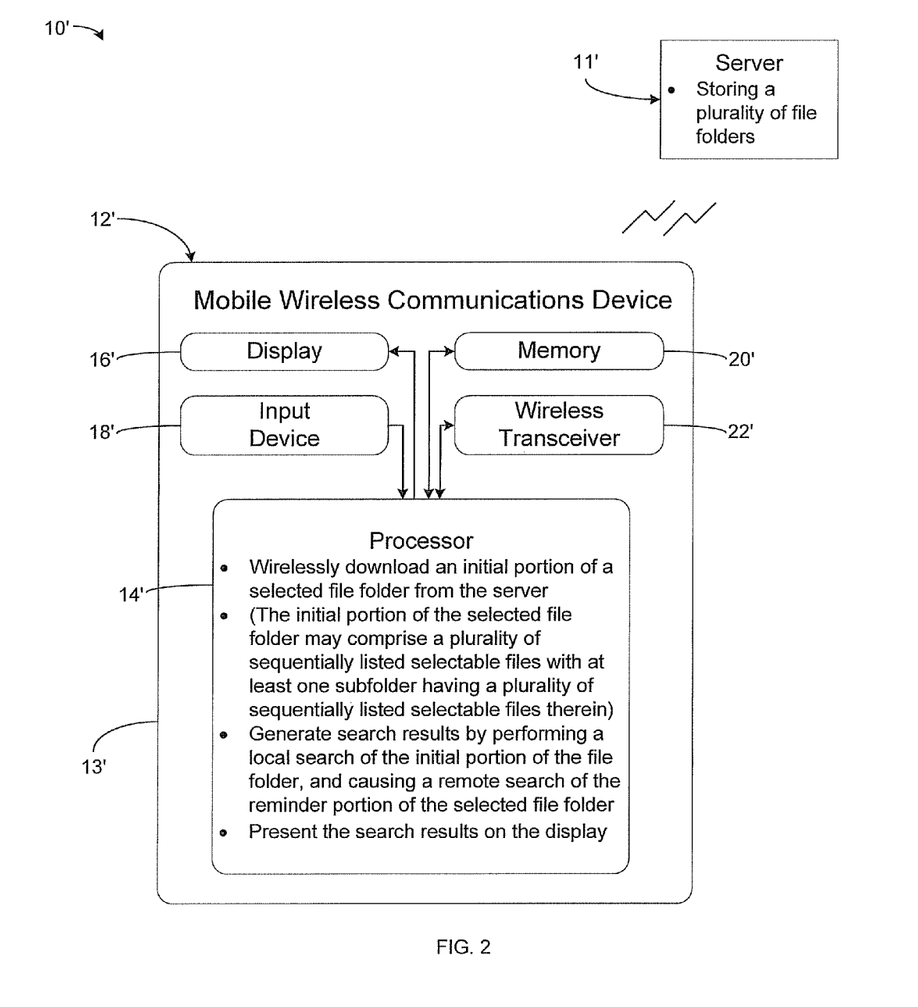
FIG. 2 is a schematic block diagram of a further embodiment of a communications system in accordance with the present disclosure.
Figure 3:
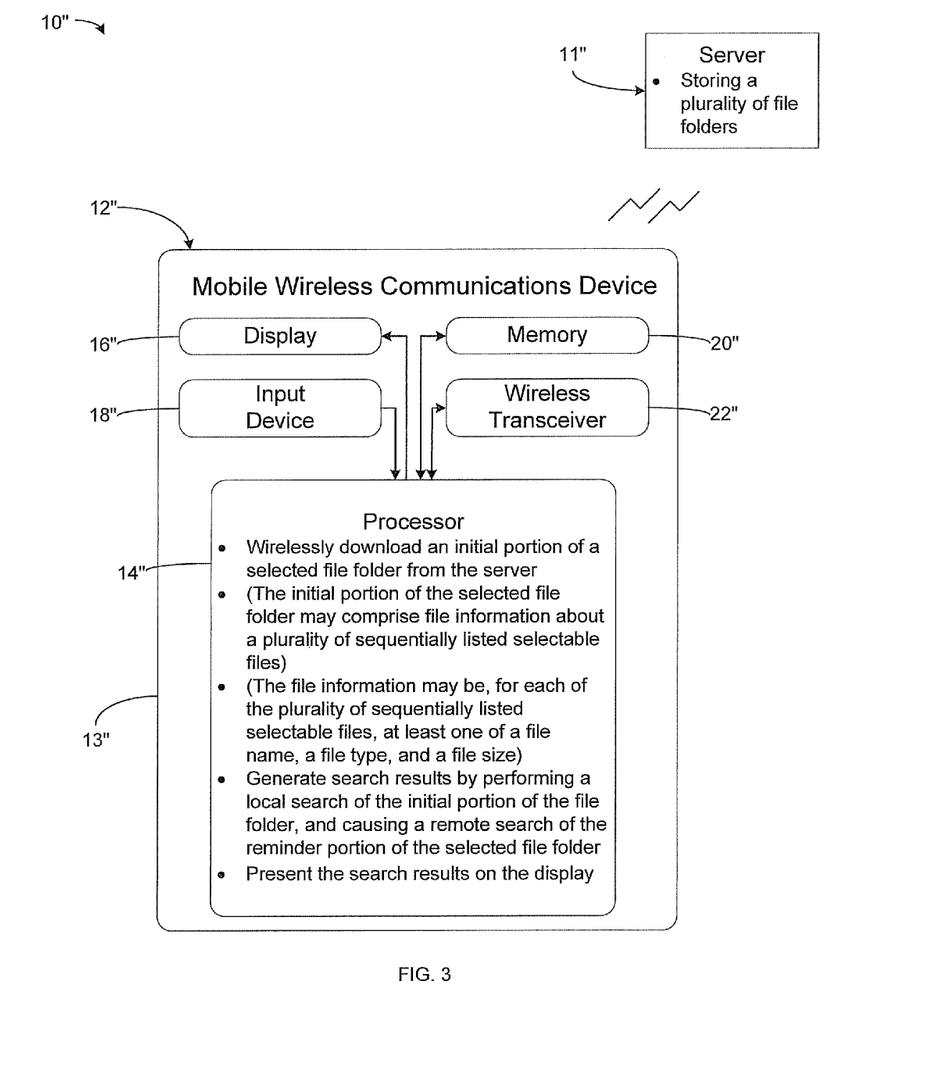
FIG. 3 is a schematic block diagram of an additional embodiment of a communications system in accordance with the present disclosure.

As shown in the communications system 10' of FIG. 2, the initial portion of the selected file folder may comprise a plurality of sequentially listed selectable files with at least one subfolder having a plurality of sequentially listed selectable filed therein. Additionally, as shown in the communications system 10" of FIG. 3, the initial portion (and the remainder portion) may include file information about the plurality of sequentially listed selectable files. Indeed, the file information may include, for each of the plurality of sequentially listed selectable files, at least one of a file name, a file type, and a file size.

Figure 4:
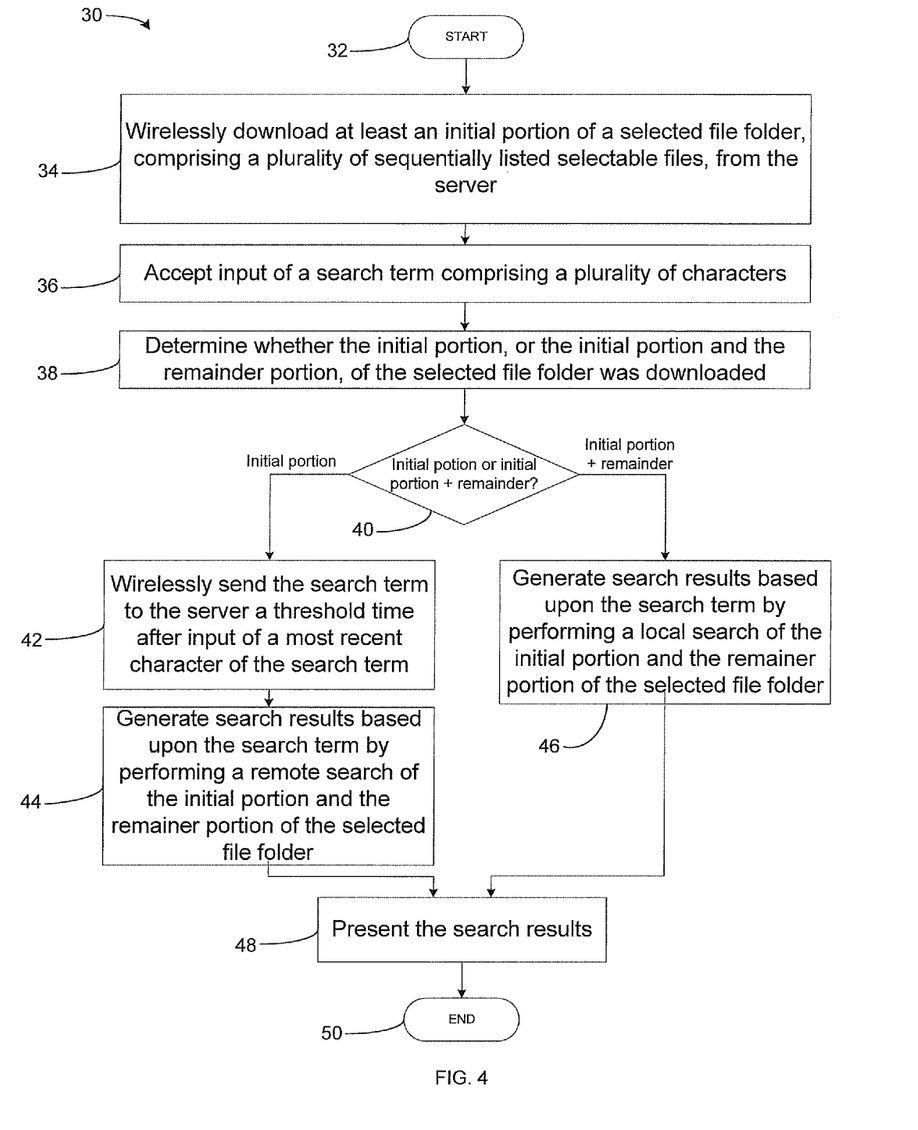
FIG. 4 is a flowchart of a method of operating the mobile wireless communications device of FIG. 1.

With reference to the flowchart 30 in FIG. 4, a detailed method of operating the mobile wireless communications device 12 of FIG. 1 is now described. After the start (Block 32), the processor 14 cooperates with the wireless transceiver 22 to wirelessly download at least an initial portion of a selected file folder from the server 11 (Block 34). The selected file folder comprises a plurality of sequentially listed selectable files, and the processor 14 may sequentially download the plurality of sequentially listed selectable files.

The processor 14 then accepts, via the input device 18, input of a search term comprising a plurality of characters (Block 36). Next, the processor 14 determines whether the initial portion (and not the remainder portion), or the initial portion and the remainder portion, of the selected file folder was downloaded (Block 38).

If the initial portion was downloaded, at Block 40, the processor 14 then wirelessly sends the search term, via the wireless transceiver 22, to the server 11 a threshold time after input of a most recent character of the search term (Block 42). This advantageously helps reduce the number of remote search requests sent to the server 11. For example, if the search term is to be "CAT," it would be undesirable to send a search request for "C," followed by a search request for "CA," followed by a search request for "CAT," if the characters are being input in a sufficiently quick enough fashion to indicate that input is likely to continue. If a threshold time passes after input of a most recent character, it is likely that input is not likely to continue, and therefore the search term should be sent to the server 11.

The processor 14 then generates search results based upon the search term by performing a remote search of both the initial portion and the remainder portion of the selected file folder (Block 44). This functionality may be advantageous in that it conserves resources of the processor 14 by not performing a local search.

Referring back to Block 40, if both the initial portion and the remainder were downloaded by the processor 14, the processor generates search results based upon the search term by performing a local search of the initial portion and the remainder portion of the selected file folder (Block 46). In this situation, since both the initial portion and the remainder portion have been downloaded, a local search may be quicker than a remote search.

The search results are then presented by the processor 14 on the display 16 (Block 48). Block 50 indicates the end of the method.

Figure 5:
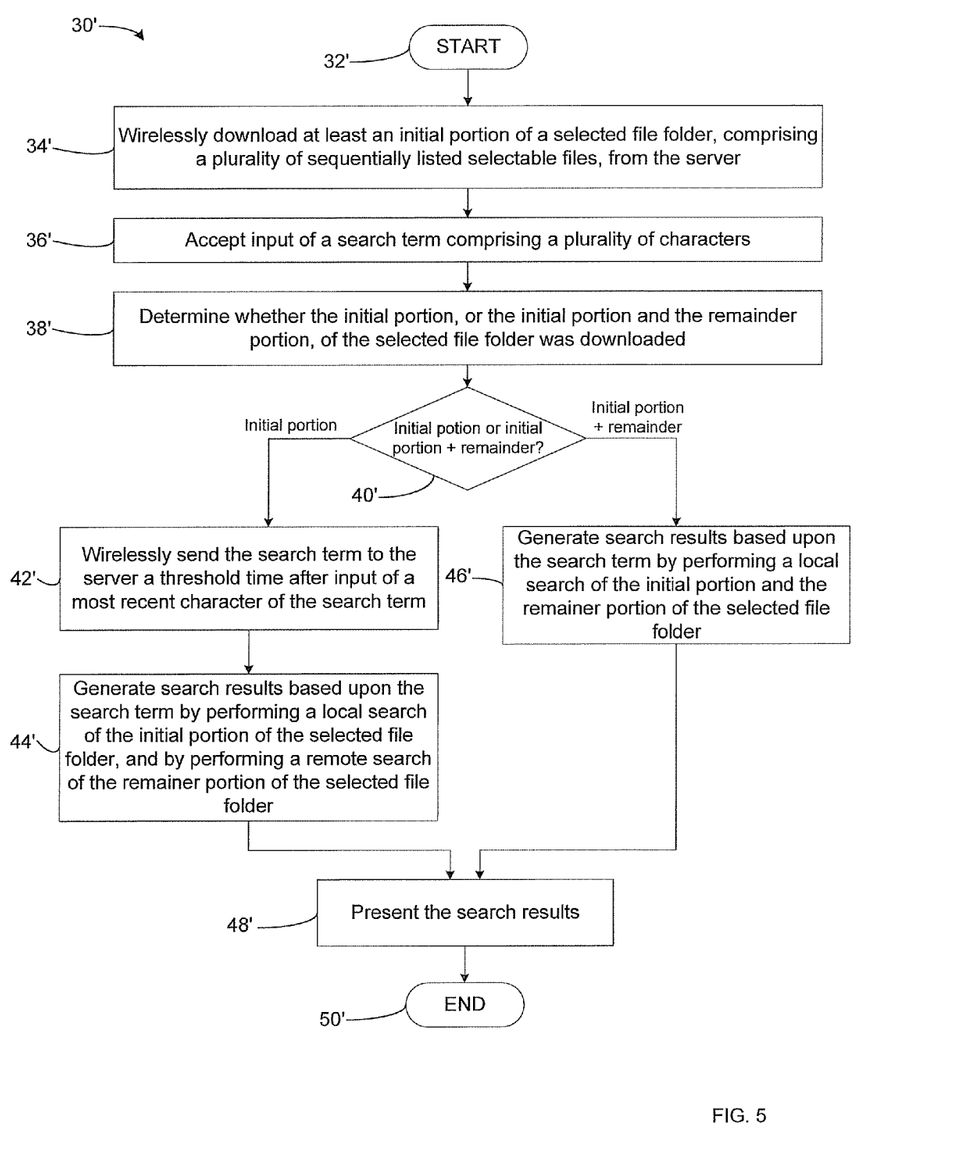
FIG. 5 is a flowchart of another method of operating the mobile wireless communications device of FIG. 1.

An additional method of operating the mobile wireless communications device 12 is now described with reference to the flowchart 30' of FIG. 5. After the start (Block 32'), the processor 14 cooperates with the wireless transceiver 22 to wirelessly download at least an initial portion of a selected file folder from the server 11 (Block 34'). The selected file folder comprises a plurality of sequentially listed selectable files, and the processor 14 may sequentially download the plurality of sequentially listed selectable files.

The processor 14 then accepts, via the input device 18, input of a search term comprising a plurality of characters (Block 36'). Next, the processor 14 determines whether the initial portion (and not the remainder portion), or the initial portion and the remainder portion, of the selected file folder was downloaded (Block 38').

If the initial portion was downloaded, at Block 40', the processor 14 then wirelessly sends the search term, via the wireless transceiver 22, to the server 11 a threshold time after input of a most recent character of the search term (Block 42').

The processor 14 then generates the search results based upon the search term by performing a local search of the initial portion of the selected file folder, and by performing a remote search of the remainder portion of the selected file folder (Block 44').

Referring back to Block 40', if both the initial portion and the remainder were downloaded by the processor 14, the processor generates search results based upon the search term by performing a local search of the initial portion and the remainder portion of the selected file folder (Block 46'). In this situation, since both the initial portion and the remainder portion have been downloaded, a local search may be quicker than a remote search.

The search results are then presented by the processor 14 on the display 16 (Block 48'). Block 50' indicates the end of the method.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of a mobile device 10, any component of or related to a network, backend, etc., or accessible or connectable thereto. Any application or module herein described may be implemented using computer readable/executable instructions that may be stored or otherwise held by such computer readable media.

Exemplary components of a mobile wireless communications device 1000 that may be used in accordance with the above-described embodiments are further described below with reference to FIG. 6. The device 1000 illustratively includes a housing 1200, a keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400. Alternatively or additionally, when the display 1600 is a touch screen display, the keypad 1400 may be a "soft" keypad implemented, for example, by providing images of keys on the display 1600.

The housing 1200 may be elongated vertically, or may take on other sizes and shapes (including clamshell housing structures). The keypad may include a mode selection key, or other hardware or software for switching between text entry and telephony entry.

Figure 6:
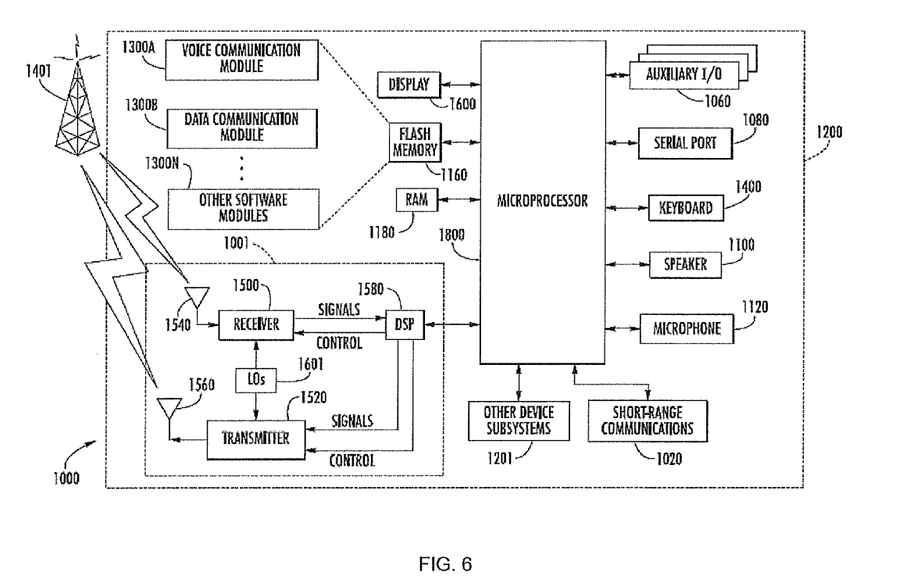
FIG. 6 is a schematic block diagram illustrating exemplary components which may used in the mobile wireless communications device of FIG. 1.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

We claim:

1. A method for a mobile wireless communication device to search a plurality of files stored on a remote server in a selected file folder, the method comprising:
 responsive to selection of a file folder containing a plurality of files stored on the remote server in a selected file folder and prior to performing a search, downloading an initial portion of the selected file folder from the server, the initial portion of the selected file folder comprising a plurality of sequentially listed selectable files;
 receiving a search query at the mobile wireless communication device after downloading the initial portion of the selected file folder;
 responsive to the search query received at the mobile wireless communication device:
  determining if a remainder portion of the selected file folder is available on the server for downloading;
  responsive to determining that a remainder portion of the selected file folder is available on the server for downloading, causing a remote search of the remainder portion of the selected file folder to obtain remote search results for the search query;
  generating local search results for the search query by performing a local search of the initial portion of the selected file folder; and
  presenting the local search results and any remote search results on a display of the mobile wireless communication device.

2. The method of claim 1, wherein receiving the search query at the mobile wireless communication device comprises:
 receiving a plurality of characters of the search query at an input of the mobile wireless communication device; and
 determining if a time since receipt of a most recent character of the plurality of characters of the search query exceeds a threshold time.

3. The method of claim 1, wherein the initial portion of the selected file folder comprises at least one subfolder having a plurality of sequentially listed selectable files therein.

4. The method of claim 1, wherein the initial portion of the selected file folder further comprises file information about the plurality of sequentially listed selectable files.

5. The method of claim 1, wherein the initial portion of the selected file folder further comprises contents of data contained in the selected file folder.

6. The method of claim 1, wherein the plurality of files comprises e-mail files.

7. The method of claim 1, wherein the plurality of files comprises media files.

8. The method of claim 1, wherein the plurality of files comprises contact files.

9. A mobile wireless communication device to communicate with a remote server storing a plurality of file folders, the mobile wireless communication device comprising:
 a display;
 a wireless transceiver; and
 a processor coupled to the display and the wireless transceiver, the processor configured to search the plurality of files stored on the remote server by:
  downloading an initial portion of the selected file folder from the server via the wireless transceiver, the initial portion of the selected file folder comprising a plurality of sequentially listed selectable files;
  receiving a search query after downloading the initial portion of the selected file folder;
  responsive to the search query:
   determining if a remainder portion of the selected file folder is available on the server for downloading;
   responsive to determining that a remainder portion of the selected file folder is available on the server for downloading, causing a remote search of the remainder portion of the selected file folder to obtain remote search results for the search query;

generating local search results for the search query by performing a local search of the initial portion of the selected file folder; and presenting the local search results and any remote search results on the display.

10. The mobile wireless communication device of claim 9, wherein receiving the search query comprises:

receiving a plurality of characters of the search query at an input of the mobile wireless communication device; and determining if a time since receipt of a most recent character of the plurality of characters of the search query exceeds a threshold time.

11. The mobile wireless communication device of claim 9, wherein the initial portion of the selected file folder comprises at least one subfolder having a plurality of sequentially listed selectable files therein.

12. The mobile wireless communication device of claim 9, wherein the initial portion of the selected file folder further comprises file information about a plurality of sequentially listed selectable files.

13. The mobile wireless communication device of claim 9, wherein the initial portion of the selected file folder further comprises contents of data contained in the selected file folder.

14. The mobile wireless communication device of claim 9, further comprising a memory operable to store the initial portion of the selected file folder.

15. A non-transitory computer readable medium containing processor executable instructions that, when executed by a processor, cause the processor to perform a method comprising:

downloading an initial portion of the selected file folder from the server via the wireless transceiver, the initial portion of the selected file folder comprising a plurality of sequentially listed selectable files;

receiving a search query after downloading the initial portion of the selected file folder;

responsive to the search query:

determining if a remainder portion of the selected file folder is available on the server for downloading;

responsive to determining that a remainder portion of the selected file folder is available on the server for downloading, causing a remote search of the remainder portion of the selected file folder to obtain remote search results for the search query;

generating local search results for the search query by performing a local search of the initial portion of the selected file folder; and presenting the local search results and any remote search results on the display.

16. The non-transitory computer readable medium of claim 15, wherein, in the method performed by the processor, receiving the search query comprises:

receiving a plurality of characters of the search query at an input of the mobile wireless communication device; and determining if a time since receipt of a most recent character of the plurality of characters of the search query exceeds a threshold time.

17. The non-transitory computer readable medium of claim 15, wherein the initial portion of the selected file folder comprises at least one subfolder having a plurality of sequentially listed selectable files therein.

18. The non-transitory computer readable medium of claim 15, wherein the initial portion of the selected file folder further comprises file information about the plurality of sequentially listed selectable files.

19. The non-transitory computer readable medium of claim 15, wherein the initial portion of the selected file folder further comprises contents of data contained in the selected file folder.

20. The non-transitory computer readable medium of claim 15, wherein the plurality of files comprises at least one of message files and contact files.

\* \* \* \* \*